United States Patent
Bethge et al.

(10) Patent No.: US 10,326,341 B2
(45) Date of Patent: Jun. 18, 2019

(54) METHOD FOR PRODUCING A ROTOR OF AN ELECTRIC ASYNCHRONOUS MACHINE

(71) Applicant: SIEMENS AKTIENGESELLSCHAFT, München (DE)

(72) Inventors: Andreas Bethge, Berlin (DE); Kai-Uwe Volker, Dorfen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 165 days.

(21) Appl. No.: 14/787,635

(22) PCT Filed: Apr. 14, 2014

(86) PCT No.: PCT/EP2014/057484
§ 371 (c)(1),
(2) Date: Oct. 28, 2015

(87) PCT Pub. No.: WO2014/177373
PCT Pub. Date: Nov. 6, 2014

(65) Prior Publication Data
US 2016/0105086 A1    Apr. 14, 2016

(30) Foreign Application Priority Data
Apr. 29, 2013   (EP) .................... 13165694

(51) Int. Cl.
*H02K 15/02* (2006.01)
*H02K 15/10* (2006.01)
*H02K 15/00* (2006.01)

(52) U.S. Cl.
CPC ................ *H02K 15/0012* (2013.01)

(58) Field of Classification Search
CPC ..... H02K 3/02; H02K 15/0012; H02K 17/165
See application file for complete search history.

(56) References Cited

U.S. PATENT DOCUMENTS 2,125,970 A    8/1938   Waters
2,387,073 A *  10/1945  Horlacher .......... H02K 15/0012
                                                   29/598

(Continued)

FOREIGN PATENT DOCUMENTS

CN    101325354 A    12/2008
DE    102010021470 A1  12/2011

(Continued)

OTHER PUBLICATIONS

"Copper Beryllium vs. Beryllium-Free Copper", by Sherry L. Baranek, www.moldmakingtechnology.com, 2002.*

*Primary Examiner* — Paul D Kim
(74) *Attorney, Agent, or Firm* — Henry M. Feiereisen LLC

(57) ABSTRACT

In a method for producing a rotor of an asynchronous electric machine, a carrier shaft is produced with shaft slots and a squirrel cage rotor is applied to the carrier shaft. The carrier shaft and an electrically conductive bulk material of nickeled copper is placed into a container so that the bulk material fills up the shaft slots. The bulk material is compacted in the container by hot isostatic pressing and thereby bonded to the carrier shaft such that nickel as diffusion material causes permanently bonding of copper to the carrier shaft. The container is then detached from the carrier shaft.

9 Claims, 2 Drawing Sheets

(56) References Cited

U.S. PATENT DOCUMENTS

| | | | |
|---|---|---|---|
| 2,784,333 A | 3/1957 | Gunselman | |
| 2,996,791 A * | 8/1961 | Hicks | H02K 17/16 29/598 |
| 3,191,270 A * | 6/1965 | Martin | H02K 1/02 29/598 |
| 3,894,253 A * | 7/1975 | Willyoung | H02K 3/51 310/61 |
| 4,447,390 A * | 5/1984 | Rozmus | B22F 3/15 264/125 |
| 4,679,314 A | 7/1987 | Lenz et al. | |
| 5,358,432 A * | 10/1994 | Shih | H02K 3/51 439/655 |
| 5,473,211 A * | 12/1995 | Arkkio | H02K 17/16 310/166 |
| 5,616,978 A * | 4/1997 | Kanai | H01C 7/00 174/126.2 |
| 5,625,243 A | 4/1997 | Lindgren et al. | |
| 6,280,265 B1 * | 8/2001 | Hopeck | H02K 3/51 310/71 |
| 6,347,968 B1 * | 2/2002 | Hamilton | H01R 13/187 439/801 |
| 6,453,540 B1 * | 9/2002 | Blakelock | H02K 15/0006 29/598 |
| 7,042,128 B2 * | 5/2006 | Zepp | H02K 7/12 310/191 |
| 7,052,241 B2 | 5/2006 | Decker | |
| 2008/0070707 A1 * | 3/2008 | Yamamoto et al. | F16C 3/00 464/182 |

FOREIGN PATENT DOCUMENTS

| | | |
|---|---|---|
| EP | 2390987 A2 | 11/2011 |
| FR | 1382377 A | 12/1964 |
| JP | H05260710 A | 10/1993 |
| RU | 2171533 C1 | 7/2001 |
| SU | 311338 A1 | 8/1971 |
| WO | WO 2005124973 A1 | 12/2005 |

* cited by examiner

METHOD FOR PRODUCING A ROTOR OF AN ELECTRIC ASYNCHRONOUS MACHINE

CROSS-REFERENCES TO RELATED APPLICATIONS

This application is the U.S. National Stage of International Application No. PCT/EP2014/057484, filed Apr. 14, 2014, which designated the United States and has been published as International Publication No. WO 2014/177373 and which claims the priority of European Patent Application, Serial No. 13165694.4, filed Apr. 29, 2013, pursuant to 35 U.S.C. 119(a)-(d).

BACKGROUND OF THE INVENTION

The invention relates to a method for producing a rotor of an asynchronous electric machine.

Rotors are component parts of asynchronous electric machines. Some of these machines have speeds in excess of 4000 revolutions per minute and outputs of more than 1 megawatt. Rotors of such machines must satisfy exacting mechanical and thermal requirements, e.g. because of the centrifugal force load and strong heating.

WO 2005/124973 A1 discloses a method for producing a rotor for an electric motor, wherein an essentially cylindrical core is provided with longitudinal slots into which a diffusion material and electrically conductive bars are inserted and bonded to the core by heat and pressure.

The electrically conductive bars used in such methods are individually pre-produced copper bars, for example, which are then nickeled and inserted in the slots, vacuum encapsulated, and diffusion bonded to the rotor core. As the bars must be insertable into the e.g. milled or turned shaft slots, they are subject to stringent accuracy-of-fit requirements, and production of the rotors therefore requires many test steps.

SUMMARY OF THE INVENTION

The object of the invention is to specify an improved method for producing rotors of asynchronous electric machines.

This object is achieved according to the invention by a method for producing a rotor of an asynchronous electric machine, in which a carrier shaft having shaft slots is produced, and a squirrel cage rotor is applied to the carrier shaft, wherein the carrier shaft and an electrically conductive bulk material are inserted into a container so that the bulk material fills up the shaft slots, the bulk material is compacted in the container by hot isostatic pressing and bonded to the carrier shaft, and, after the hot isostatic pressing, the container is detached from the carrier shaft.

Advantageous embodiments of the invention are set forth in the sub-claims.

In the inventive method for producing a rotor of an asynchronous electric machine, a slotted carrier shaft is first produced. A squirrel cage rotor is then applied to the carrier shaft. To apply the squirrel cage rotor, the carrier shaft and an electrically conductive bulk material are placed into a container so that the bulk material fills up the shaft slots. The bulk material in the container is compacted and bonded to the carrier shaft by hot isostatic pressing (HIP). After hot isostatic pressing, the container is detached from the carrier shaft.

According to the invention, the squirrel cage rotor is therefore produced from a bulk material introduced into the slots of the carrier shaft, said material being compacted and bonded to the carrier shaft by hot isostatic pressing. This advantageously eliminates the known prior art practice of manufacturing individual molded parts fitting the shaft slots and inserting the molded parts individually into the shaft slots. The method according to the invention therefore significantly simplifies the production of squirrel cage rotors compared to the known prior art method in which individual molded parts are inserted into the shaft slots. In addition, the method according to the invention also reduces production costs, as it eliminates the cost-intensive individual manufacture of accurately fitting molded parts.

Another advantage of the method according to the invention is that it also makes it easy to produce complicated shapes of squirrel cage rotors merely by shaping the shaft slots accordingly. The method thereby facilitates the production of squirrel cage rotors having optimized mechanical and electrical characteristics, particularly in respect of the mechanical strength and the electrical efficiency of the squirrel cage rotor.

An embodiment of the invention provides that a nickeled copper bulk material is used as the bulk material.

Another embodiment of the invention provides that the carrier shaft is made of steel.

Primarily because of its good electrical conductivity, copper is an advantageously suitable material for squirrel cage rotors.

Nickeling of the copper bulk material is advantageous, as nickel has proved to be particularly suitable metallurgically as a diffusion material for permanently bonding copper to a carrier shaft, particularly if the carrier shaft is made of steel. Nickeling of the copper bulk material also has the advantage that it eliminates separate nickeling of sections of the squirrel cage rotor, such as the individual nickeling of the copper bars in the known method cited above.

Primarily because of its strength, steel is an advantageously suitable material for carrier shafts.

Another embodiment of the invention provides that the container is essentially implemented as a closed metal tube.

This embodiment advantageously provides a simple and low-cost production process for hot isostatic pressing of suitable containers. The metal tube serves on the one hand to shape the squirrel cage rotor by defining the space to be filled by the bulk material, and, on the other, the metal tube prevents the ingress into the bulk material of process gas used in hot isostatic pressing and any porosity of the produced squirrel cage rotor caused by such ingress of process gas.

Another embodiment of the invention provides that the container has a shape and size corresponding to the carrier shaft, so that the outside of the carrier shaft interspersed with shaft slots is in contact with the inside of the container when the shaft is inserted into the container.

This embodiment makes it possible to suitably delimit the space filled by the bulk material and produce a rotor having an even surface.

Another embodiment of the invention provides that the carrier shaft and the container are essentially cylindrical in shape.

As a result, a rotor is produced having a cylindrical shape which is generally advantageous for the rotation of the rotor.

In this embodiment of the invention, the container is preferably detached from the carrier shaft by a twist-off motion.

This means that the container is removed from the carrier shaft in a particularly simple and inexpensive manner.

Another embodiment of the invention provides that the carrier shaft and the container are designed such that the space filled by the bulk material in the container has a cohesive structure.

In this way, a cohesive squirrel cage rotor is produced directly by hot isostatic pressing in a single manufacturing step, thereby advantageously eliminating additional electrically conductive connecting of individual sections of the squirrel cage rotor.

Another embodiment of the invention provides that, during hot isostatic pressing, the container is heated in an autoclave filled with a process gas. The process gas used is preferably argon.

These embodiments of the invention make use of known and established types of hot isostatic pressing.

BRIEF DESCRIPTION OF THE DRAWING

The above described characteristics, features and advantages of the invention and the manner in which they can be achieved will become clearer and more readily understandable in conjunction with the following description of an exemplary embodiment which will now be explained in greater detail with reference to the accompanying drawings in which.

DETAILED DESCRIPTION OF PREFERRED EMBODIMENTS

Figure 1:
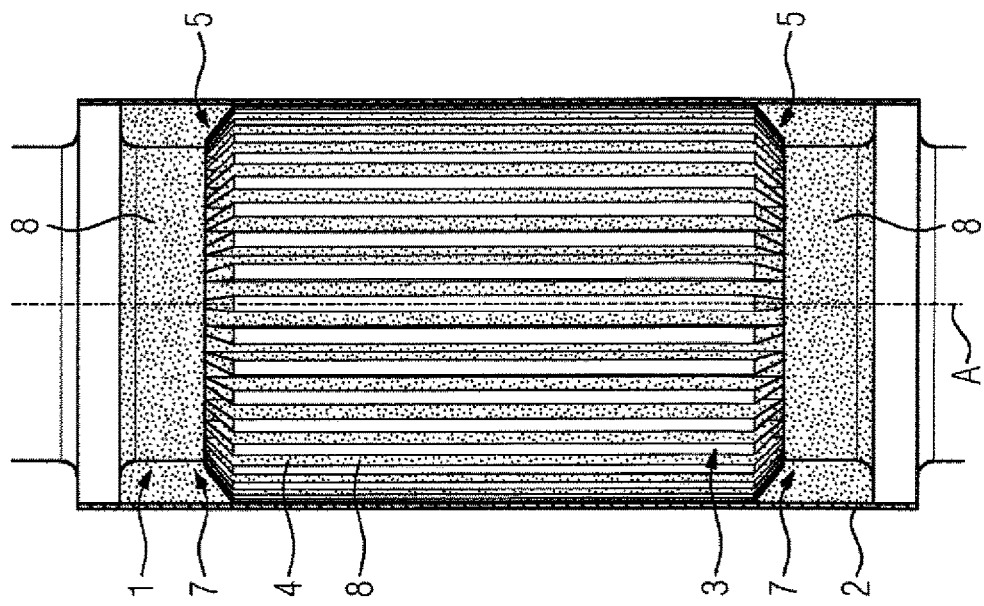
FIG. 1 schematically illustrates a carrier shaft of a rotor of an asynchronous electric machine in a container, and FIG. 2 schematically illustrates a carrier shaft of a rotor of an asynchronous electric machine and electrically conductive bulk material in a container.

Mutually corresponding parts are provided with the same reference characters in the drawings.

FIG. 1 schematically illustrates a carrier shaft 1 of a rotor of an asynchronous electric machine in a container 2.

The carrier shaft 1 is essentially of circular cylindrical shape, wherein a cylinder envelope 3 of the carrier shaft 1 has a plurality of shaft slots 4 running parallel to a cylinder axis A. The end sections 5 of the cylinder envelope 3 are conical in the form of truncated cones which taper toward the ends of the cylinder envelope 3.

The container 2 is likewise of circular cylindrical shape, wherein its inner diameter corresponds to the outer diameter of the cylinder envelope 3 of the carrier shaft 1. The cylinder envelope 3 of the container 2 is implemented as a metal tube.

With the method according to the invention for producing the rotor, the carrier shaft 1 is inserted into the container 2 as shown in FIG. 1, so that the metal tube is in contact with the cylinder envelope 3 of the carrier shaft 1, said cylinder envelope having the shaft slots 4. The container 2 is shown cut open in FIG. 1 in order to make clear the position of the carrier shaft 1 inside the container 2. The longitudinal extent of the container 2 exceeds the longitudinal extent of the cylinder envelope 3 of the carrier shaft 1, so that after insertion of the carrier shaft 1 into the container 2 as shown in FIG. 1, end regions 7 of the interior of the container 2 which are delimited by the end sections 5 of the cylinder envelope 3 of the carrier shaft 1 remain clear and the shaft slots 4 lead into these end regions 7.

Figure 2:
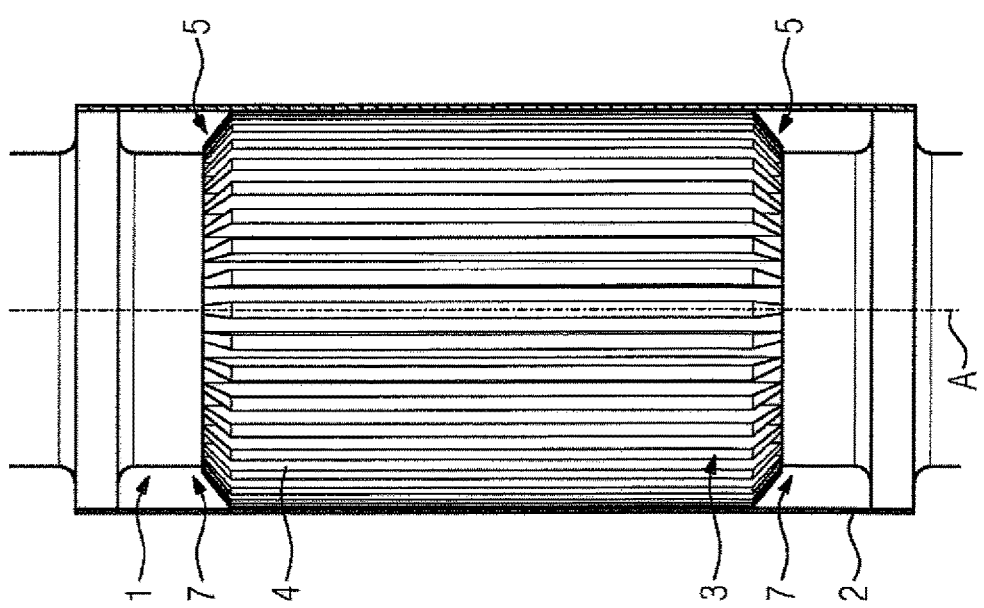

As FIG. 2 shows, the space not taken up by the carrier shaft 1 inside the container 2 is filled with an electrically conductive bulk material 8 so that the bulk material 8 fills up the shaft slots 4 of the carrier shaft 1 and the end regions 7 of the interior of the container 2. As the shaft slots 4 lead into the end regions 7, the space filled up by the bulk material 8 in the container 2 has a cohesive structure.

In this exemplary embodiment, the bulk material 8 is a nickeled copper bulk material.

Figure 3:
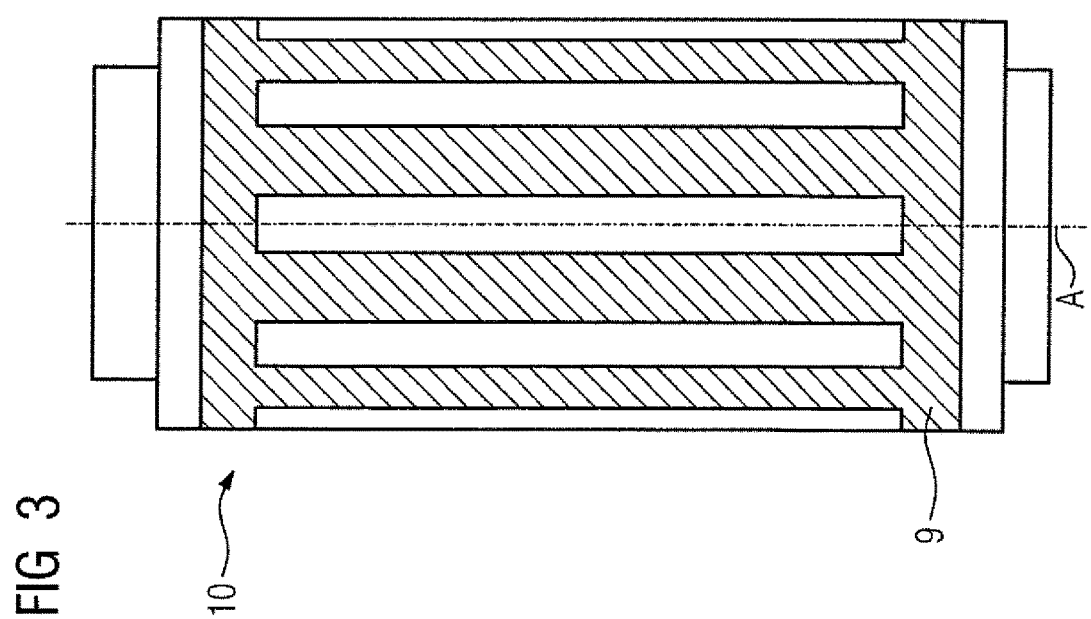
FIG. 3 schematically illustrates a squirrel cage rotor that exhibits a squirrel cage. The squirrel cage rotor is the end product of the manufacturing process described and shown in FIG. 1 and FIG. 2.

FIG. 3 shows a squirrel cage rotor 10 that exhibits a squirrel cage 9. According to the invention, the bulk material 8 is compacted in the container 2 by hot isostatic pressing and bonded to the carrier shaft 1, said container 2 being heated under high pressure in an autoclave filled with argon as the process gas. This produces a cohesive squirrel cage rotor 10 applied to the carrier shaft 1, said rotor being constituted by the compacted bulk material 8. After the hot isostatic pressing, the metal tube of the container 2 is twisted off the carrier shaft 1.

Although the invention has been illustrated and described in detail by an exemplary embodiment, the invention is not limited by the examples disclosed and other variations may be inferred therefrom by the average person skilled in the art without departing from the scope of protection sought to the invention.

What is claimed is:

1. A method for producing a squirrel cage rotor of an asynchronous electric machine, comprising:
    producing a carrier shaft with a cylinder envelope having shaft slots and with two opposite end sections that are located at two opposite longitudinal sides of the cylinder envelope and are conical in the form of truncated cones each starting from each longitudinal end of the cylinder envelope and tapering exclusively to each respective end of the carrier shaft;
    applying a squirrel cage to the carrier shaft;
    placing the carrier shaft and an electrically conductive bulk material of nickeled copper into a single-piece container having a longitudinal extent which exceeds a longitudinal extent of the cylinder envelope having the shaft slots so that the bulk material fills up the shaft slots;
    compacting the bulk material in the single-piece container by hot isostatic pressing and thereby bonding the bulk material to the carrier shaft such that nickel as diffusion material causes permanently bonding of copper to the carrier shaft; and
    detaching the single-piece container from the carrier shaft after hot isostatic pressing.

2. The method of claim 1, wherein the carrier shaft is made of steel.

3. The method of claim 1, wherein the container is a metal tube.

4. The method of claim 1, wherein the container has a shape and size corresponding to a shape and size of the carrier shaft so that an outer side of the carrier shaft interspersed with the shaft slots is in contact with an inner side of the container after the carrier shaft has been placed into the container.

5. The method of claim 1, wherein the container is essentially cylindrical in shape, said envelope of said carrier shaft being cylindrical in shape.

6. The method of claim 1, further comprising detaching the container from the carrier shaft by a twist-off motion.

7. The method of claim 1, wherein the carrier shaft and the container are designed such that a space filled by the bulk material in the container has a cohesive structure.

8. The method of claim 1, further comprising heating the container in a process-gas-filled autoclave during hot isostatic pressing.

9. The method of claim 8, wherein argon is used as process gas in the autoclave during the hot isostatic pressing.

* * * * *